Sept. 8, 1936.   R. D. EVANS   2,053,426
ELECTRIC DISCHARGE APPARATUS
Filed Nov. 11, 1933
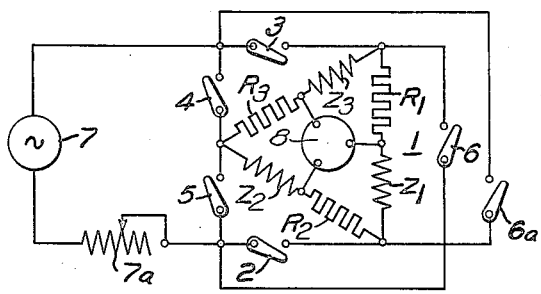
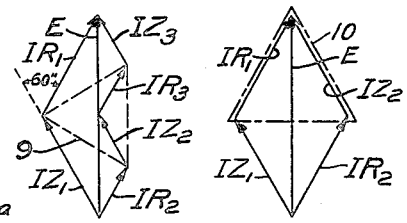
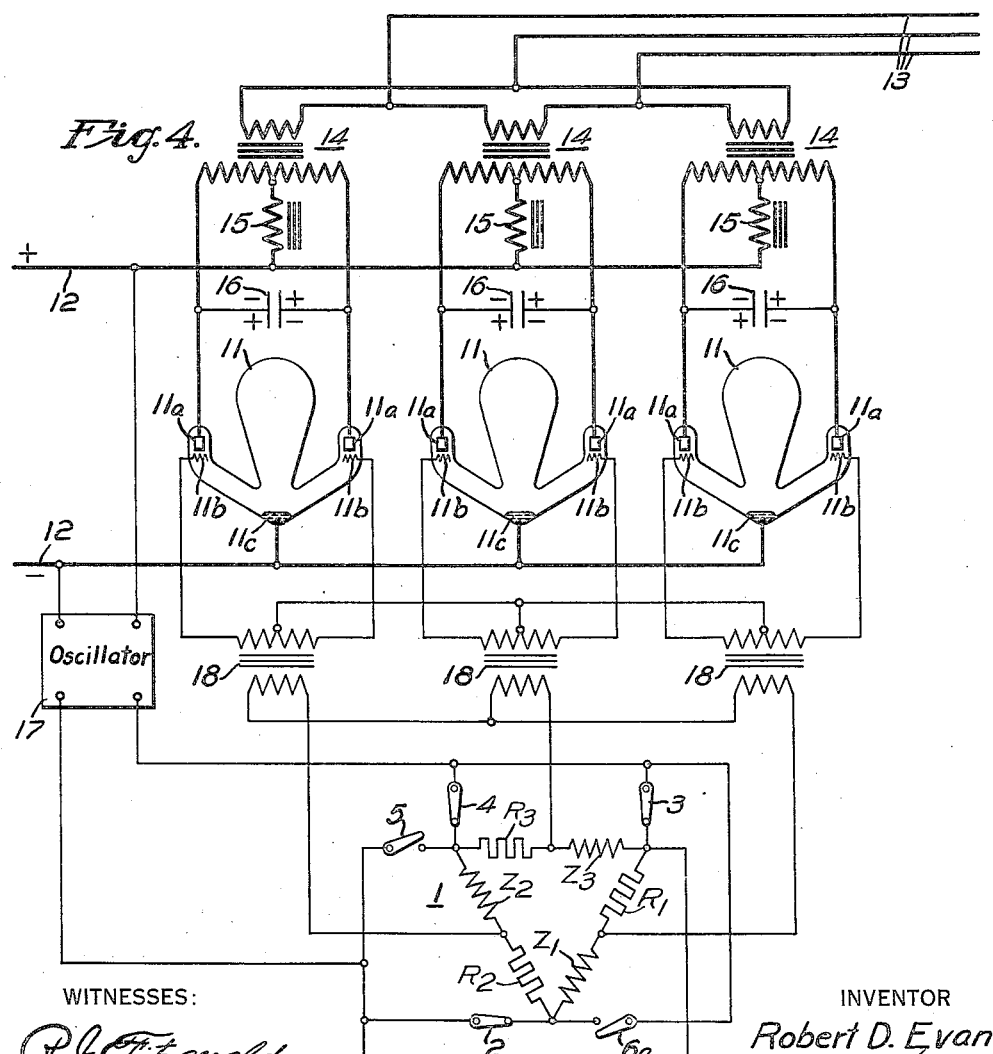
WITNESSES:
P. J. Fitzgerald
Geo. O. Harrison
INVENTOR
Robert D. Evans.
BY
ATTORNEY Patented Sept. 8, 1936

2,053,426

UNITED STATES PATENT OFFICE 2,053,426

ELECTRIC DISCHARGE APPARATUS

Robert D. Evans, Swissvale, Pa., assignor to Westinghouse Electric & Manufacturing Company, East Pittsburgh, Pa., a corporation of Pennsylvania Application November 11, 1933, Serial No. 697,675

6 Claims. (Cl. 175—363)

My invention relates to electric discharge apparatus and particularly to such apparatus in which a plurality of anode-cathode discharge paths are rendered conductive in a repeating sequence at accurately timed intervals. As an example of apparatus of the type to which my invention is applicable, may be mentioned carrier frequency systems in which a plurality of carrier channels are opened in a repeating sequence. Other examples are discharge apparatus of the type used to interconnect direct current circuits and polyphase alternating current circuits for the transfer of power, such as rectifiers and inverters.

In inverters of the type in which direct current power is converted to polyphase alternating current power by means of electric discharge apparatus, it is necessary to control the grid excitation of the mercury arc tubes or other discharge apparatus used in the inverter by means of balanced polyphase voltages, in order to insure balanced polyphase output voltages. In order to obtain such polyphase excitation voltages, it has heretofore been the practice to use a rotating machine such as a polyphase induction motor having one phase excited from a single phase source. In such an arrangement, the quadrature field of the motor is never quite equal to the field along the excited axis, as the motor operates slightly below synchronous speed, and the polyphase voltage induced in the motor windings is accordingly somewhat unbalanced. In order to avoid this disadvantage, as well as other disadvantages of rotating machinery, it has been proposed to use a plurality of synchronized oscillators for supplying the polyphase excitation voltage. However, because of the complications of such synchronization, the latter arrangement has never come into commercial use.

It is an object of my invention to provide a novel static impedance network for producing the polyphase grid excitation voltage required in apparatus of the type indicated above, which shall operate to modify the output voltage of a single-phase source such as an oscillator to obtain a balanced polyphase system of excitation voltages.

Another object of my invention is to provide novel static means for controlling the grid excitation of electric discharge apparatus having a plurality of grid controlled discharge paths, in such a manner that the discharge paths are rendered conducting in an accurately timed sequence.

A further object of my invention is to provide a novel inverter system for transferring power from a direct current circuit to a polyphase alternating current circuit.

Another object of my invention is to provide a novel static phase modifying network, having a plurality of terminals, which shall be effective to produce balanced polyphase voltage in response to single phase voltage impressed across any pair of the terminals or any two groups of the terminals, regardless of the permutations of terminals connected to form a group.

Other objects of my invention will become evident from the following detailed description taken in conjunction with the accompanying drawing in which:

Figure 1 is a diagrammatic view of a static phase modifying device constructed in accordance with my invention;

Figs. 2 and 3 are vector diagrams illustrating the operation of the apparatus shown in Fig. 1, and Fig. 4 is a diagrammatic view of an inverter system embodying my invention.

Referring to Fig. 1 of the drawing in detail, three resistors $R_1$, $R_2$, and $R_3$, and three impedance elements $Z_1$, $Z_2$ and $Z_3$ are connected alternately in a series circuit to form a delta 1 as shown. The absolute impedances of all the resistors $R_1$, $R_2$ and $R_3$ and all the impedances $Z_1$, $Z_2$ and $Z_3$ are equal, but the impedance phase angles of the impedance elements $Z_1$, $Z_2$ and $Z_3$ are 60° greater than the impedance phase angles of the resistors $R_1$, $R_2$ and $R_3$. Although I have shown the elements $R_1$ to $R_3$ as resistors and the elements $Z_1$ to $Z_3$ as inductive impedances, it will be obvious that the impedance relationships indicated above may also be satisfied by impedance elements of other types.

A number of switches 2, 3, 4, 5, 6 and 6a are provided for connecting the delta points of the delta mesh or network 1, singly or in pairs, to the terminals of an alternating current source 7, in series with a variable impedance 7a. A polyphase translating device 8, upon which balanced three phase voltage is to be impressed, is connected to the branches of the delta mesh 1, at the junction points between the resistors $R_1$, $R_2$ and $R_3$ and the corresponding impedances $Z_1$, $Z_2$ and $Z_3$ respectively.

The operation of the above described apparatus may be set forth as follows: Upon closure of two of the switches 2 to 6 which connect a delta branch of the network 1 to the source 7, for example, upon closure of the switches 2 and 3, impedance drops are set up in the branches of the network 1 of such magnitude and phase relationship that balanced three phase voltage is impressed on the terminals of the translating device 8. The magnitude and phase relationships of the impedance drops in the network 1, when the switches 2 and 3 are closed, are shown vectorially in Fig. 2.

Referring to Fig. 2, the voltage of the source 7 is represented by the vector E. This voltage divides vectorially between the resistor $R_1$ and the impedance $Z_1$ into equal parts $IR_1$ and $IZ_1$, displaced by a phase angle of 60° as shown. In the circuit consisting of resistor $R_2$, impedance $Z_2$, resistor $R_3$ and impedance $Z_3$, the voltage E divides into four equal parts $IR_2$, $IZ_2$, $IR_3$ and $IZ_3$, displaced successively by phase angles of 60°. As may be seen from Fig. 2, the voltages applied to the translating device 8 form an equilateral triangle 9, corresponding to balanced three phase voltages. Because of the symmetry of the network 1, it will be obvious that if instead of switches 2 and 3 (Fig. 1) either switches 3 and 5, or 2 and 4 are closed, balanced three phase voltage will also be applied to the translating device 8.

If the switches 2, 3 and 4 are closed, the resistor $R_3$ and the impedance $Z_3$ are short circuited through the switches 3 and 4, and the remaining two branches of the network 1 are connected in parallel to the source 7. The voltages existing under these conditions, are as shown vectorially in Fig. 3. In the branch consisting of resistor $R_1$ and impedance $Z_1$, the voltage E divides into equal 60° displaced parts $IR_1$ and $IZ_1$. In the branch consisting of resistor $R_2$ and impedance $Z_2$, the voltage E similarly divides into equal 60° displaced parts $IR_2$ and $IZ_2$. The voltage impressed upon the translating device 8 is in this case also an equilateral triangle 10. It may be shown that balanced output voltages are also produced if the switches 2, 3 and 5 or 2, 4 and 6 are closed.

A study of the phase relationships of the polyphase output voltages of the network 1 will show that by the closure of the switches 2 to 6a in the permutations 2—3; 2—4; 3—5; 6—6a; 5—6a and 4—6 successively, the output voltage triangle may be rotated in steps of 60° through the entire range of 360°, and that the polyphase voltages produced always have the same phase sequence. These conclusions may be verified mathematically by means of the phase sequence or symmetrical component theory. The output voltage triangle may be varied in magnitude without change of symmetry by adjusting the variable impedance $7a$.

Referring to Fig. 4 which shows an inverter circuit embodying my invention, three electric discharge devices 11, shown as mercury arc tubes, are provided for transferring power from a direct current circuit 12 to an alternating current circuit 13.

The electric discharge devices 11 are constructed with anodes $11a$, grids $11b$ and cathodes $11c$ enclosed in a sealed vessel containing mercury vapor at low pressure, in a manner well understood in the art. The characteristics of these devices are such that a unidirectional discharge current can be started when an anode $11a$ is at a positive potential of at least a predetermined critical value with reference to the corresponding cathode $11c$, and the electric field produced by the intervening grid $11b$ is of such direction and value as to permit a discharge to be started. For simplicity it will be assumed that each of the grids $11b$ blocks the flow of current whenever the potential of the grid $11b$ is negative with reference to the corresponding cathode $11c$, and that the grid is in proper condition to permit a discharge current to flow when it is positive with reference to the corresponding cathode $11c$. After a discharge current has started from an anode $11a$ to the corresponding cathode $11c$, it cannot be interrupted by subsequent control of the potential of the corresponding grid $11b$, but may be interrupted by reducing the potential of the anode $11a$ below the critical value mentioned above. The above described characteristics are typical of a large class of electric discharge devices known in the art, any of which may be used in the practice of my invention. Although I have shown three discharge devices 11, each having two anode-cathode discharge paths, it will be obvious that other arrangements of discharge apparatus may be used, providing the total number of anode-cathode paths is suitable for the practice of the invention.

The anodes of the three discharge devices 11 are connected to the primary windings of suitable transformer apparatus for supplying the alternating current circuit 13, shown as three transformers 14, having primary windings tapped at their midpoints. The midpoint taps of the transformers 14 are connected in series with suitable reactors 15 to the positive conductor of the direct current circuit 12. The secondary windings of the transformer 14 are connected to the alternating current circuit 13. A condenser 16 is connected between the anodes $11a$ of each of the discharge devices 11, for periodically extinguishing the anode-cathode arcs of the device in a manner which will be hereinafter more fully explained.

A static phase modifying network 1, constructed in the manner described above in connection with Figs. 1 to 3, is provided for controlling the potential of the grids $11b$ of the discharge devices 11. The network 1 may be provided with a set of switches 2 to 6a as in Fig. 1, and is connected to a suitable alternating current source such as an oscillator, shown diagrammatically at 17. The output terminals of the network 1 are connected to any suitable apparatus for transforming balanced three-phase voltage to balanced six-phase voltage, shown as three separate transformers 18. The grids of the discharge devices 11 are connected to the six-phase terminals of the transformers 18, and the three cathodes of the devices 11 are connected together to the negative conductor of the direct current circuit 12.

The operation of the apparatus shown in Fig. 4 may be set forth as follows: Assuming the oscillator 17 to be in operation and a suitable combination of the switches 2 to 6, such as switches 2, 3 and 4 to be closed, the network 1 operates in the manner explained in connection with Fig. 1 to produce balanced three-phase voltage. The three-phase output voltage of the network 1 is transformed to balanced six-phase voltage by the transformers 18, and applied to the grids $11b$. It will be noted that opposite phases of the six-phase supply are applied to the two grids of any discharge device 11, so that one grid of each device is positive while the other is negative and vice versa. The operation of the discharge devices 11 is as follows. Considering first the left electric discharge device 11, at the instant when the left grid $11b$ thereof passes from negative potential to positive potential, a current flow starts in a circuit which may be traced from the positive conductor of the direct current circuit 12, through the left reactor 15, the left side of the primary circuit of the left transformer 14 and the left anode-cathode path of the discharge device 11 to the negative conductor of circuit 12. In response to this current flow, the impedance of the left anode-cathode path becomes very small because of the falling volt-ampere characteristic of the arc path, as is well known in the art. As the resistance of the anode-cathode path is now small compared to the resistance of the remainder of the circuit traced above, the left condenser 16 becomes charged in the direction indicated by the upper polarity marks, to a potential slightly less than the potential of circuit 12.

One half cycle (180°) later, the left grid 11b becomes negative and the right grid 11b becomes positive. The arc current which was started by the left grid 11b is not extinguished by the negative potential of the left grid, but continues to flow. However, the positive potential of the right grid 11b establishes another arc in the right anode-cathode path of the device 11, and momentarily current flows in both paths. The arc in the right anode-cathode path reduces the impedance of the path to a very low value because of the arc stream volt-ampere characteristic, and the potential of the charged condenser 16 acts to force a current through a local circuit from the right anode to the left anode 11c. No current can flow in this local circuit, however, because of the unidirectional conductivity of the left anode-cathode path. The voltage of the condenser 16 accordingly acts in opposition to the voltage of the circuit 12 in the left anode-cathode path, reducing the effective voltage acting between anode and cathode in this path to a value below the critical voltage mentioned above. As an arc cannot be sustained at anode voltages below the critical value, the arc in the left anode-cathode path is extinguished.

As soon as the arc in the left anode-cathode path is extinguished, the negative potential of the left grid 11b raises the impedance of the left anode-cathode path to substantially infinity. The condenser 16 accordingly discharges momentarily through the primary winding of transformer 14 and becomes charged in the opposite direction, indicated by the lower polarity marks. It will be seen that the above described cycle repeats indefinitely, causing pulsating currents to flow in the two halves of the primary winding of the left transformer 14 at timed intervals determined by the frequency and phase relationship of the voltages applied to the grids 11b. The pulsating currents in the primary winding of the left transformer 14 produce an alternating flux in the transformer core and an alternating secondary voltage, in a manner well understood in the art.

As the center and right discharge devices 11 act in the same manner as the left device 11 but at time intervals leading or lagging by 120°, three phase voltage is induced in the secondary windings of the transformers 14, assuming that the various transformer connections are of proper polarity.

The switches 2 to 6 provide a convenient means for shifting the polyphase output voltage of the inverter in steps of 60°, as may be desirable in connecting the inverter to alternating current circuits having star-delta or zigzag connected transformer apparatus. Although I have described my invention in connection with electric discharge apparatus of the arc or glow type, it will be obvious that in its broader aspects the invention is also applicable to discharge apparatus of the thermionic type.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In combination with electric discharge apparatus having a plurality of control elements, a source of single phase voltage, and a static impedance network energized from said source for supplying polyphase excitation voltage to said control elements, said network including a first group of impedance elements of equal absolute impedance values, and a second group of impedance elements equal in absolute impedance to the elements of said first group but differing therefrom in impedance phase angle.

2. In combination with electric discharge apparatus having a plurality of control elements, a source of single phase voltage, and a static impedance network energized from said source for supplying polyphase excitation voltage to said control elements, said network including a first group of three impedance elements of equal absolute impedance values, a second group of three impedance elements equal in absolute impedance to the elements of said first group, but differing therefrom in impedance phase angle by 60°, and conductors connecting said impedance elements of said first and second groups alternately in a delta mesh.

3. In combination, polyphase electric discharge apparatus having a plurality of principal electrodes electrically associated in a plurality of discharge paths and having a plurality of control elements for said paths, said apparatus being of a type in which a unidirectional discharge current may be started in any of said paths when the corresponding control element is in a predetermined electrical condition and in which the discharge current may be stopped when the voltage acting between the corresponding principal electrodes falls below a predetermined value, a source of single-phase voltage, means for controlling the initiation of discharges of said apparatus including a mesh of connected impedances energized from said source of single-phase voltage and designed to supply a polyphase symmetrical system of phase-displaced electrical conditions to said control elements to thereby render said paths conducting in a timed sequence, said mesh including impedances of different energy storage characteristics, and means associated with said principal electrodes for controlling the voltages therebetween including means for reducing said last mentioned voltages below said predetermined value in a polyphase timed sequence.

4. In an inverter, polyphase electric discharge apparatus having a plurality of anodes, cathode means electrically associated with said anodes in a plurality of discharge paths, and a plurality of control elements for said paths, said apparatus being of a type in which a unidirectional discharge current may be started in any of said paths when the corresponding control element is in a predetermined electrical condition and in which the discharge current may be stopped when the corresponding anode voltage falls below a predetermined value, a direct current source of anode voltage for all of said anodes, a source of single phase voltage, means for supplying polyphase excitation voltage to said control elements including a mesh of connected impedances energized from said source of single-phase voltage and designed to provide a symmetrical system of phase-displaced electrical conditions, said mesh including impedances of different energy storage characteristics, and means associated with said anodes for reducing the anode voltages acting in said paths below said predetermined value sequentially in polyphase relationship at predetermined intervals during a cycle of said single phase source.

5. In an inverter, electric discharge apparatus having a plurality of anodes, cathode means electrically associated with said anodes in a plurality of discharge paths, and a plurality of control elements for said paths, said apparatus being of a type in which a unidirectional discharge current may be started in any of said paths when the corresponding control element is in a predetermined electrical condition and in which the discharge current may be stopped when the corresponding anode voltage falls below a predetermined value, a direct current source of anode voltage for all of said anodes, a source of single-phase voltage, means for supplying polyphase excitation voltage to said control elements, including a static impedance network energized from said single phase source, said network including a first group of three impedance elements of equal absolute impedance values, a second group of three impedance elements equal in absolute impedance to the elements of said first group but differing therefrom in impedance phase angle by 60°, and conductors connecting said impedance elements of said first and second groups alternately in a delta mesh, and means associated with said anodes for reducing the anode voltages acting in said paths below said predetermined value sequentially at predetermined intervals during a cycle of said single phase source.

6. In an inverter, mercury arc apparatus having a plurality of pairs of anodes, cathode means electrically associated with said anodes in a plurality of discharge paths and a plurality of pairs of grids corresponding to said pairs of anodes and interposed in said paths; a direct current source of voltage for all of said anodes; a source of single phase voltage; means for supplying polyphase excitation voltage to said grids of such phase relationship that the voltages supplied to the grids of each of said pairs are displaced by 180°, said last mentioned means including a static impedance network energized from said single phase source; and condensers connected between the anodes of each of said pairs.

ROBERT D. EVANS.